United States Patent [19]

Keogh

[11] Patent Number: 4,987,190

[45] Date of Patent: Jan. 22, 1991

[54] SCORCH CONTROL IN THE GRAFTING OF DIACID ANHYDRIDES ONTO HIGH DENSITY POLYETHYLENE

[75] Inventor: Michael J. Keogh, Bridgewater, N.J.

[73] Assignee: Union Carbide Chemicals and Plastics Company Inc., Danbury, Conn.

[21] Appl. No.: 365,614

[22] Filed: Jun. 13, 1989

[51] Int. Cl.$^5$ .................... C08F 255/02; C08L 23/26
[52] U.S. Cl. ..................................... 525/193; 525/285
[58] Field of Search ............................. 525/193, 194

[56] References Cited

U.S. PATENT DOCUMENTS

| | | | |
|---|---|---|---|
| 4,506,056 | 3/1985 | Gaylord | 524/445 |
| 4,612,155 | 9/1986 | Wong et al. | 525/193 |

FOREIGN PATENT DOCUMENTS

| | | |
|---|---|---|
| 235876 | 9/1987 | European Pat. Off. |
| 56-122816 | 9/1981 | Japan . |
| 57-100105 | 6/1982 | Japan . |
| 60-099148 | 6/1985 | Japan . |
| 1136115 | 12/1968 | United Kingdom . |

*Primary Examiner*—Carman J. Seccuro
*Attorney, Agent, or Firm*—Saul R. Bresch

[57] ABSTRACT

A composition comprising:
(i) a homopolymer or copolymer of ethylene and one or more other alpha-olefins wherein the portion of the copolymer based on ethylene is at least about 60 percent by weight based on the weight of the copolymer, said polymers having a density of at least 0.940 gram per cubic centimeter;
(ii) a homopolymer or copolymer of propylene and one or more other alpha-olefins wherein the portion of the copolymer based on propylene is at least about 60 percent by weight based on the weight of the copolymer; and
(iii) an anhydride of an unsaturated aliphatic diacid.

8 Claims, No Drawings

SCORCH CONTROL IN THE GRAFTING OF DIACID ANHYDRIDES ONTO HIGH DENSITY POLYETHYLENE

TECHNICAL FIELD

This invention relates to a composition which is useful in the grafting of diacid anhydrides onto high density polyethylene.

BACKGROUND ART

Some of the major technological applications for unsaturated aliphatic diacid anhydrides, particularly maleic anhydride, grafted polyolefins is to form adhesive olefin polymers, compatibilized olefin polymers, and reversible crosslinked base resins. Maleic anhydride grafted polyolefins also find utility as adhesion promoters because of their compatibility with polar copolymers such as ethylene/ethyl acrylate copolymers, ethylene/vinyl acetate copolymers, polyesters, and polyamides because of the nature of the anhydride.

Because of its low melt/flow indices and other physical characteristics, maleic anhydride grafted high density polyethylene is considered to be particularly suited to rotomolding. Unfortunately, the technique for grafting maleic anhydride to the high density polyethylene is conducive to scorch, i.e., premature crosslinking, and the various methods, which have been developed to control scorch, show little benefit for high density polyethylene. Further, the scorch control additives tend to decrease the modulus of the grafted product while rotomolding applications require the retention of high modulus.

DISCLOSURE OF THE INVENTION

An object of this invention, therefore, is to provide a composition, which is suitable for use in the preparation of a maleic, or similar, anhydride grafted high density polyethylene essentially without the attendant scorch.

Other objects and advantages will become apparent hereinafter.

According to the present invention, the above object is met by a composition comprising:
  (i) a homopolymer or copolymer of ethylene and one or more other alpha-olefins wherein the portion of the copolymer based on ethylene is at least about 60 percent by weight based on the weight of the copolymer, said polymers having a density of at least 0.940 gram per cubic centimeter;
  (ii) a homopolymer or copolymer of propylene and one or more other alpha-olefins wherein the portion of the copolymer based on propylene is at least about 60 percent by weight based on the weight of the copolymer; and
  (iii) an anhydride of an unsaturated aliphatic diacid.

DETAILED DESCRIPTION

The homopolymers and copolymers of ethylene having a density of at least 0.940 gram per cubic centimeter can be prepared by conventional methods such as the low pressure process described in Introduction to Polymer Chemistry, Stille, published by John Wiley and Sons, New York, 1962, pages 151 to 153. At least about 60 percent by weight of the copolymer is derived from ethylene, the balance being derived from one or more higher alpha-olefins, preferably having 3 to 12 carbon atoms. The melt index of the polyethylene can be in the range of about 0.1 to about 100 grams per 10 minutes and is preferably in the range of about 1 to about 20 grams per 10 minutes.

The useful homopolymers and copolymers of propylene can also be prepared by conventional processes, e.g., see U.S. Pat. No. 4,414,132 issued on Nov. 8, 1983. The copolymers include at least about 60 percent by weight propylene derived moieties with the remainder being derived from one or more other alpha-olefins, preferably having 2 or 4 to 12 carbon atoms. The density of the polypropylene can be in the range of about 0.890 to about 0.910 gram per cubic centimeter and the melt index can be in the range of about 0.1 to about 100 grams per 10 minutes.

The alpha-olefin comonomers in either the ethylene or propylene copolymers can be present in amounts of about 1 to about 40 percent by weight based on the weight of the copolymer, and are preferably present in amounts of about 2 to about 25 percent by weight. Useful alpha olefin comonomers are exemplified by ethylene, propylene, 1-butene, 1-hexene, 4-methyl-1-pentene, and 1-octene.

Anhydrides of unsaturated aliphatic diacids having 4 to 20 carbon atoms, and preferably 4 to 10 carbon atoms, are commonly grafted to various polyolefins. Examples of anhydrides, which are useful in this invention, are maleic anhydride, itaconic anhydride, and nadic anhydride. The preferred anhydride is maleic anhydride. Excess anhydride, if present after grafting, can be removed by devolatilization at temperatures in the range of about 200° C. to about 250° C.

The grafting is accomplished by using an organic peroxide catalyst, i.e., a free radical generator, such as dicumyl peroxide; lauroyl peroxide; benzoyl peroxide; tertiary butyl perbenzoate; di(tertiary-butyl) peroxide; cumene hydroperoxide; 2,5-dimethyl-2,5-di(t-butylperoxy) hexyne-3; 2,5-dimethyl-2,5-di(t-butylperoxy)-hexane; tertiary butyl hydroperoxide; isopropyl percarbonate; and alpha,alpha'-bis(tertiarybutylperoxy)diisopropylbenzene. The organic peroxide catalyst may be added together with the anhydride.

The proportions of components in the composition based on 100 parts of component (i), i.e. the ethylene homopolymer or copolymer component, in parts by weight, are as follows:

| Component | Broad Range | Preferred Range |
| --- | --- | --- |
| (ii) propylene homopolymer or copolymer | about 1 to about 60 | about 5 to about 25 |
| (iii) anhydride | about 0.5 to about 10 | about 1 to about 5 |
| (iv) organic peroxide | about 0.1 to about 5 | about 0.25 to about 1 |
| (v) antioxidant | about 0.01 to about 1 | about 0.1 to about 0.5 |

Grafting temperatures can be in the range of about 100° to about 300° C. and are preferably in the range of about 150° to about 200° C.

A typical procedure for grafting maleic anhydride onto polyethylene is described in U.S. Pat. No. 4,506,056 issued on Mar. 19, 1985.

Grafting can also be accomplished by adding a solution of anhydride, an organic peroxide catalyst, and an organic solvent to a mixture of polyethylene and polypropylene in particulate form. The organic peroxide catalyst is soluble in the organic solvent. Various organic solvents, which are inert to the reaction, can be used. Examples of useful organic solvents are acetone, methyl ethyl ketone, methyl propyl ketone, 3-pentanone, and other ketones. Other carrier solvents which allow solubilization of peroxide and anhydride and which strip off well under appropriate devolatilization conditions may be used. Acetone is a preferred solvent because it acts as a stripping agent for residuals such as non-grafted anhydride or anhydride by-products.

The anhydride solution can contain about 10 to about 50 percent by weight anhydride; about 0.05 to about 5 percent by weight organic peroxide catalyst; and about 50 to about 90 percent by weight organic solvent based on the total weight of the solution. A preferred solution contains about 20 to about 40 percent anhydride; about 0.1 to about 2 percent peroxide; and about 60 to about 80 percent solvent.

Conventional additives can also be added to the basic composition. The solution of anhydride, peroxide, and organic solvent may be added before or after all of the additives have been added. This will depend on the nature of the additives and their function. The amount of additive is usually in the range of about 0.01 to about 60 percent by weight based on the weight of the resin. Useful additives are antioxidants, ultraviolet absorbers, antistatic agents, pigments, dyes, fillers, slip agents, fire retardants, plasticizers, processing aids, lubricants, stabilizers, smoke inhibitors, viscosity control agents, vulcanizing agents, crosslinking agents, crosslinking catalysts, and crosslinking boosters.

The maleic anhydride grafted resin is useful as a reversible crosslinkable base resin for rotomolding, pipe crosslink applications, and other molded article applications.

A reversible crosslinkable resin is one which can be crosslinked, for example, with a diol at about 20° C., and, at higher temperatures of about 150° C., can be un-crosslinked, i.e., the resin is no longer crosslinked, becomes thermoplastic, is easily molded, and can be crosslinked, once again, at about 20° C. The crosslinking agent can be an aliphatic diol, which are exemplified by ethylene glycol, propylene glycol, 1,4-butanediol, 1,5-pentanediol, 1,6-hexanediol, 1,4-dimethanolcyclohexane, and 1,4 pentanediol.

Patents and other publications mentioned in this specification are incorporated by reference herein.

The invention can be illustrated by the following examples.

EXAMPLE 1 TO 5

A homopolymer of ethylene having a density of 0.942 grams per cubic centimeter and a melt index of 40 grams per 10 minutes and polypropylene having a density of 0.900 gram per cubic centimeter and a melt flow of 9.1 grams per 10 minutes, and being produced from the comonomers propylene and 1-hexene, are blended with maleic anhydride and antioxidant in a Brabender mixer fitted with a 40 gram head. The 1-hexene is present in the polypropylene in an amount of 3 percent by weight based on the weight of the copolymer. The blend is fluxed and mixed at 160° C. before adding dicumyl peroxide. The temperature is then raised to 180° C. for five minutes. Material is discharged, pressed, and used for rheometer, melt index, and flow index measurement, and then subsequently fluxed at 150° C. followed by the addition of 2.6 parts by weight cyclohexane-1,4-dimethanol (per 100 parts by weight total polymer). The product of reaction with the diol is measured by rheometer to determine the crosslink level, which is an indicator of the extent of incorporation of maleic anhydride in the graft.

The proportions of components and the results are set forth in the Table.

Notes to Table:
1. The rheometer measures melt viscosity in pound-inches. The rheometer test is carried out according to the Monsanto Rheometer Test Procedure described in U.S. Pat. No. 4,018,852.
2. Melt Index is determined under ASTM D-1238, Condition E. It is measured at 190° C. and reported as grams per 10 minutes (g10 min).
3. Flow Index is determined under ASTM D-1238, Condition F. It is measured at 10 times the weight used in the melt index test above. The value given is the average of two flow indices determined for the same composition.

TABLE

| Example | 1 | 2 | 3 | 4 | 5 |
|---|---|---|---|---|---|
| Component | | | | | |
| polyethylene | 100 | — | 95 | 85 | 75 |
| polypropylene | — | 100 | 5 | 15 | 25 |
| maleic anhydride | 4.0 | 4.0 | 4.0 | 4.0 | 4.0 |
| antioxidant | 0.1 | 0.1 | 0.1 | 0.1 | 0.1 |
| dicumyl peroxide | 0.5 | 0.5 | 0.5 | 0.5 | 0.5 |
| Results | | | | | |
| rheometer (no diol) | 12 | <1 | 6 | 4 | 1 |
| melt index (g/10 min) | No Flow | — | — | 0.50 | 0.32 |
| flow index (g/10 min) | 0.15 | — | — | 32 | 103 |
| rheometer (plus diol) | 32 | <1 | 27 | 19 | 19 |
| rheometer (plus diol) minus rheometer (no diol) | 20 | 0 | 21 | 15 | 18 |

I claim:
1. A process for grafting comprising introducing into a reaction zone, under grafting conditions, a composition comprising:
  (i) a homopolymer or copolymer of ethylene and one or more other alpha-olefins wherein the portion of the copolymer based on ethylene is at least about 60 percent by weight based on the weight of the copolymer, said polymers having a density of at least 0.940 gram per cubic centimeter;
  (ii) a homopolymer or copolymer of propylene and one or more other alpha-olefins wherein the portion of the copolymer based on propylene is at least about 60 percent by weight based on the weight of the copolymer, said homopolymer or copolymer being present in an amount of about 1 to about 60 parts by weight based on 100 parts by weight of component (i);
  (iii) an anhydride of an unsaturated aliphatic diacid having 4 to 20 carbon atoms, said anhydrides being present in an amount of at least about 0.5 part by weight based on 100 parts by weight of component (i); and

(iv) a free radical initiator in an amount of at least about 0.1 part by weight based on 100 parts by weight of component (i).

2. The process defined in claim 1 wherein the anhydride is present in an amount of about 1 to about 5 parts by weight.

3. The process defined in claim 1 wherein the anhydride is maleic anhydride.

4. The process defined in claim 1 wherein the free radical initiator is present in an amount of about 0.1 to about 5 parts by weight.

5. The process defined in claim 1 wherein the free radical initiator is an organic peroxide.

6. The process defined in claim 1 wherein the homopolymer or copolymer of propylene is present in an amount of at least about 5 parts by weight.

7. The product of the process defined in claim 1.

8. The product of the process defined in claim 1 crosslinked with an aliphatic diol.

* * * * *